April 21, 1936.   M. P. BLOMBERG ET AL   2,037,755
RAILWAY CAR BRAKE
Filed Oct. 18, 1934   3 Sheets-Sheet 2
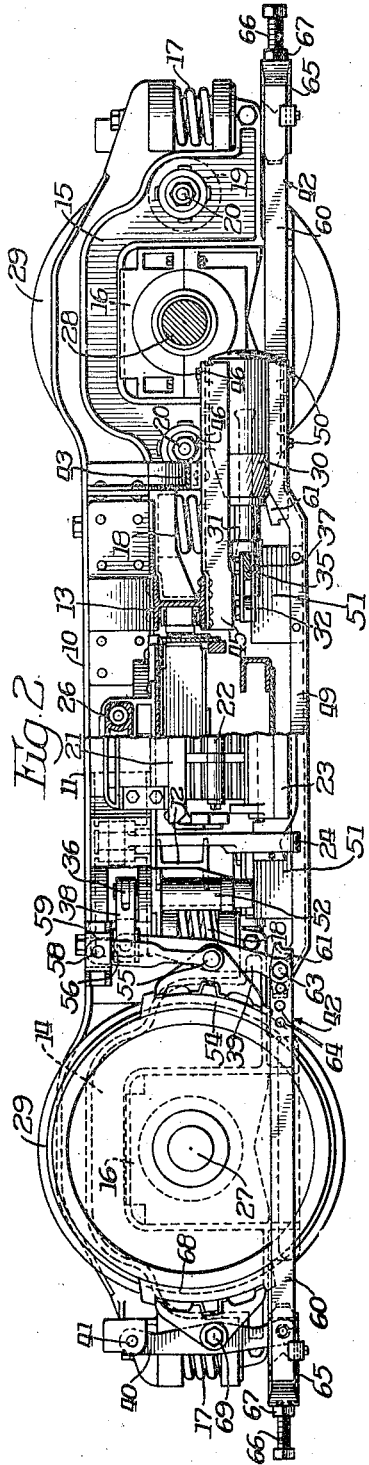
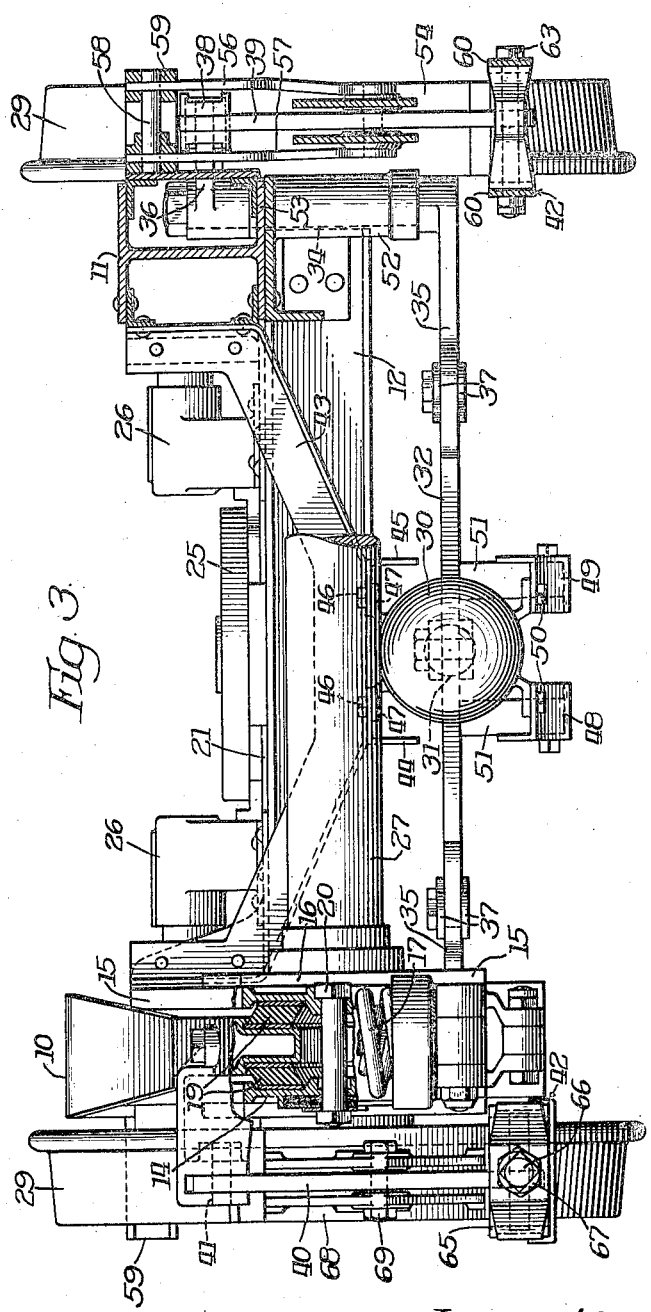
Inventors
Martin P. Blomberg
Milton E. Shaver
By Gilson, ~~~~ V Cox
Attys

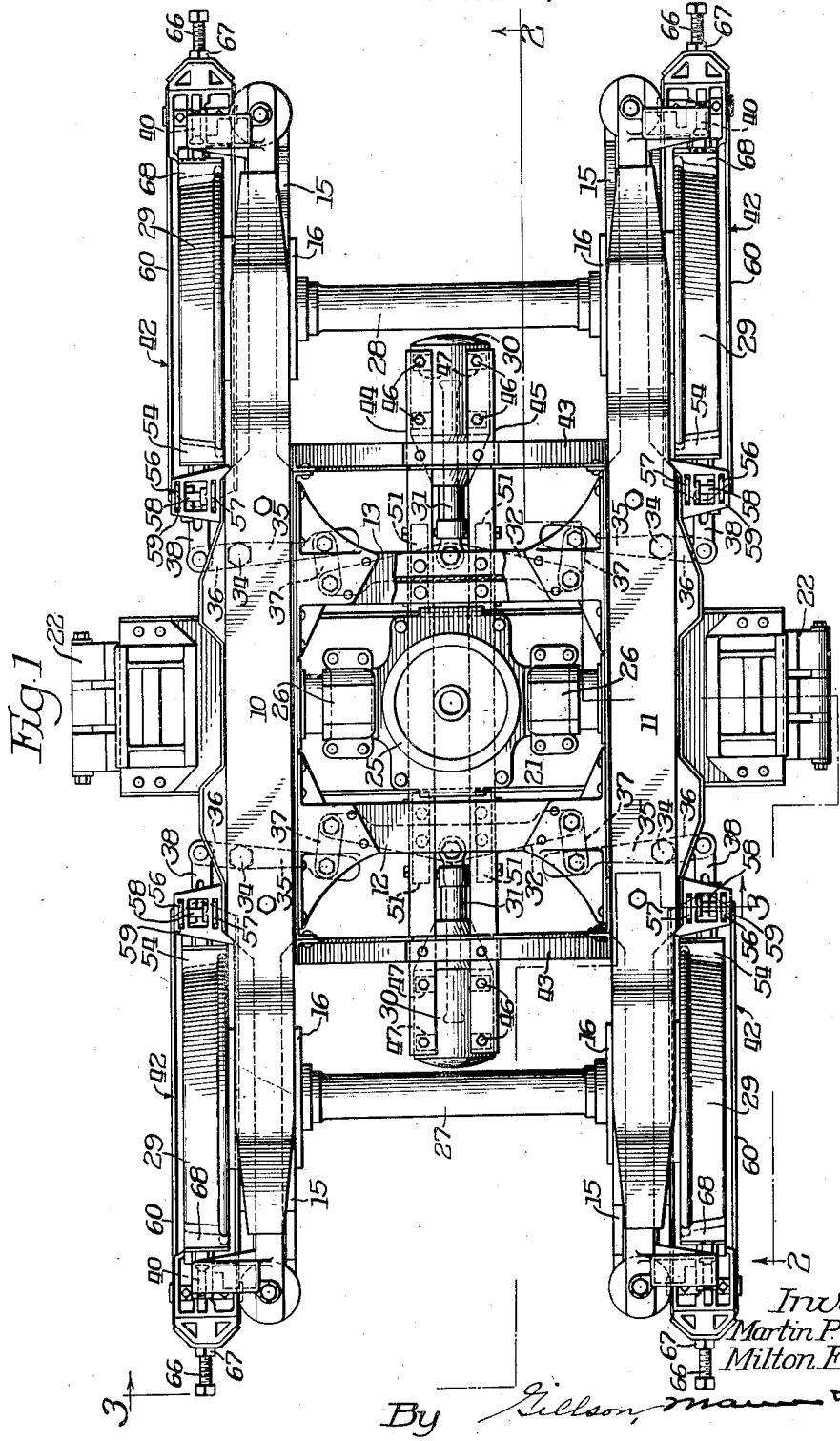

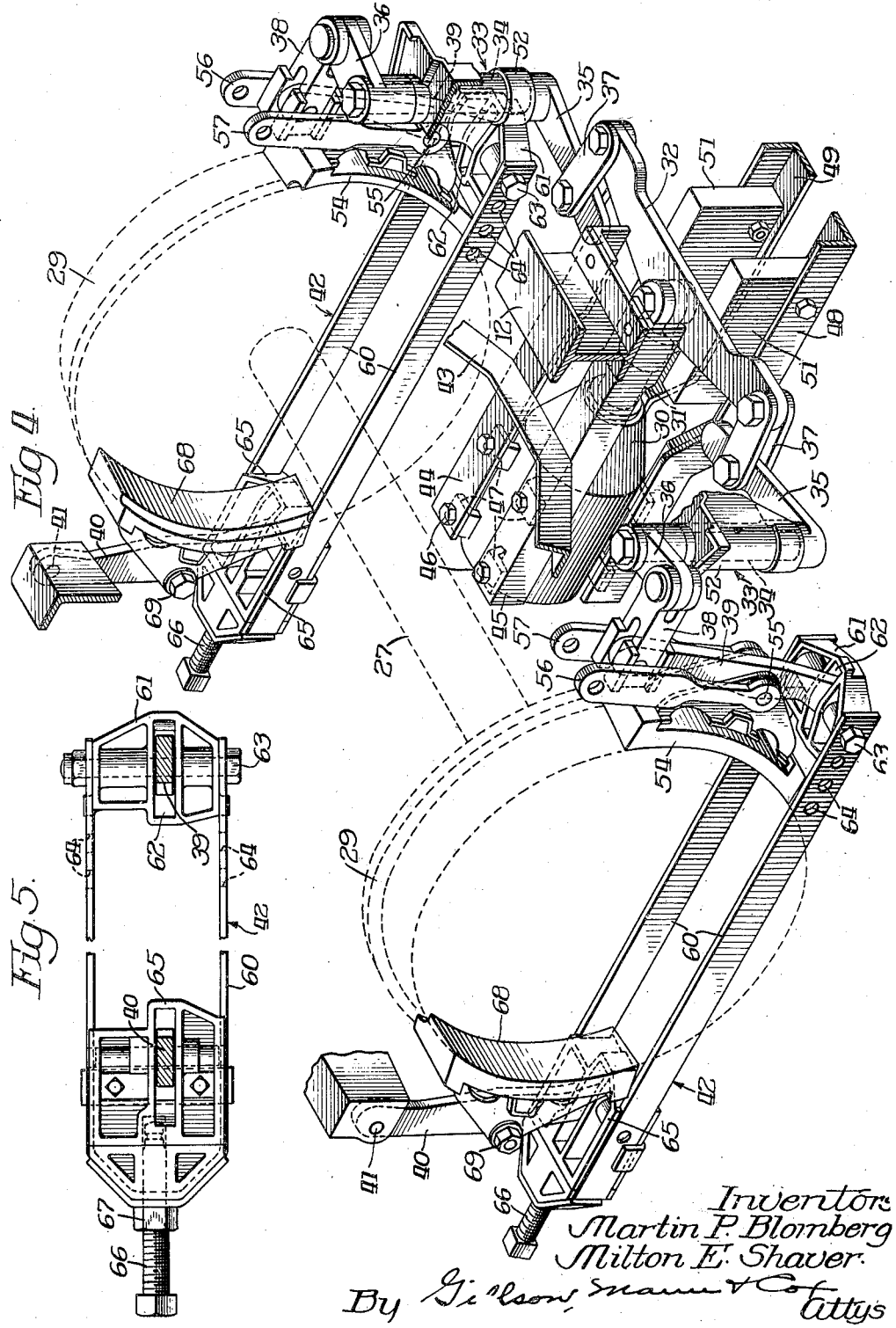

Patented Apr. 21, 1936

2,037,755

UNITED STATES PATENT OFFICE 2,037,755

RAILWAY CAR BRAKE

Martin P. Blomberg and Milton E. Shaver, Chicago, Ill., assignors to Pullman-Standard Car Manufacturing Company, Chicago, Ill., a corporation of Delaware Application October 18, 1934, Serial No. 748,876

10 Claims. (Cl. 188—56)

This invention relates to a railway car truck of the type which carries its own braking equipment including one or more brake cylinders, and among the principal objects of the invention are the following: To provide independent brake gear for each wheeled axle; to arrange the gear and brake cylinder or cylinders so that economical use is made of available space; to mount a pair of brake cylinders in tandem and connect them so that braking reaction is substantially removed from the truck frame; and to accomplish the above advantages with minimum weight and cost of equipment.

Further and other objects and advantages will become apparent as the disclosure proceeds and the description is read in conjunction with the accompanying drawings, in which Fig. 1 is a plan view of a car truck made in accordance with this invention;

Fig. 2 is a side view of the truck, the left half of the truck being shown in elevation and the right half in section (see section line 2—2 of Fig. 1);

Fig. 3 is an end view likewise combining elevation and section (see section line 3—3 of Fig. 1);

Fig. 4 is a somewhat diagrammatic, perspective view of the preferred form of braking equipment, the view being taken on the transverse center line of the truck and looking toward the end of the truck; and Fig. 5 is a plan view of the adjustable bottom connection between the live and dead truck levers.

A preferred form of the invention has been shown in the drawings and will hereafter be described, but it will be understood that changes and modifications may be made in the physical structure without departing from the spirit of the invention. The appended claims, therefore, are to be construed as broadly as the prior art will permit.

In the illustrative embodiment of the invention, the car truck comprises a built-up truck frame composed essentially of side frames 10 and 11, transoms 12 and 13, and wing castings 14 and 15, the latter constituting pedestal arms which rest upon journal boxes 16 and support the truck frame by coil springs 17 and 18. The side frames do not contact with the journal boxes but ride freely on the coil springs 17 and 18 assisted by rubber annuli 19 which are clamped between the wing castings and the side frame by bolts 20.

A bolster 21 is supported in conventional manner on elliptical springs 22 which in turn seat upon a spring plank 23 supported by swing hangers 24 pivoted to the side frames 10 and 11. The bolster carries a truck center plate or center bearing 25 and buffers 26, the latter engaging the side frames 10 and 11 and yieldingly resisting side movement of the bolster.

Inasmuch as the specific fabrication of the truck frame is not a part of the present invention except in so far as it provides points of anchorage for certain parts of the braking equipment, a further description of the truck frame generally is believed unnecessary.

The truck frame is mounted on wheeled axles 27 and 28, the wheels being indicated at 29. Each wheeled axle has its own brake system including a brake cylinder 30, in which a push rod 31 reciprocates, and brake gear comprising an equalizer lever 32, the center of which is pivotally joined with the push rod, a pair of power multiplying devices generally designated 33, each of which consists of a rock shaft 34 having a relatively long arm 35 and a relatively short arm 36, the former being connected by a link 37 to the end of the equalizer lever 32, and the latter being connected by a compression link 38 to the upper end of a live truck lever 39. A dead truck lever 40, fulcrumed at 41 to the truck frame, has its lower end connected by an adjustable bottom connection 42 to the lower end of the live truck lever 39 so that braking force applied to the top of the live truck lever will be transmitted through the bottom connection to the dead truck lever.

The brake cylinders 30 associated with each wheeled axle are arranged in tandem and each is supported from the truck frame by an angle bracket 43 and top angle braces 44 and 45. The angle bracket 43 has its ends secured to the side frames 10 and 11 and the intermediate part of the bracket is depressed (see Fig. 3) for attachment to the braces 44 and 45.

The two angle braces extend from the adjacent transom to the rear end of the brake cylinder and bolts 46 secure the braces to lugs 47 formed on the brake cylinder.

The two brake cylinders are connected beneath the transoms 12 and 13 by tie bars 48 and 49, bolts 50 passing through the tie bars and engaging lugs on the underside of the brake cylinders and serving to firmly anchor the brake cylinders to the tie bars.

Adjacent to the inner ends of the brake cylinders, the tie bars are slightly depressed, as shown in Fig. 2 in order to clear the spring plank. Blocks 51 are mounted on the depressed portions of the tie bars to slidably support the equalizer levers 32, as best shown in Fig. 4.

Braking forces are transmitted from the push rod through the equalizer bar, links 37, arms 35, rock shaft 34, arms 36, compression links 38 to the truck levers which apply the brake shoes to the wheels in conventional manner. Each of the rock shafts 34 is swivel-mounted in a casting 52 secured to the adjacent transom and side frame (see Figs. 2 and 3). The rock shaft projects through the bottom flange 53 of the side frame and receives the collared end of the arm 36 which is keyed to the shaft and transmits braking force to the compression link 38 and thence to the top of the live truck lever 39.

The inside brake shoes 54 are fulcrumed at 55 to the live truck levers and are supported from the truck frame by hangers 56 and 57 (see Figs. 1, 3 and 4) pivoted at 58 to a lug 59 projecting outwardly from the side frame.

The bottom connection 42 consists of a yoke 60 into the open end of which a pivot casting 61 is bolted as shown in Fig. 5. The casting has a vertical slot 62 adapted to receive the bottom end of the live truck lever 39 and a bolt 63 passes through the lever and holds it in place.

The pivot casting 61 may be secured to the yoke at any one of a number of positions, openings 64 being provided for this purpose.

The closed end of the yoke receives a crosshead block 65 which may be adjustably positioned by means of a take-up screw 66 equipped with a lock nut 67. By suitably positioning the crosshead block within the yoke, the slack in the brake gear may be properly adjusted.

The outside brake shoes 68 are fulcrumed on the dead truck levers by a bolt 69 as best shown in Figs. 3 and 4.

When the brakes are to be applied, fluid pressure is delivered to the two brake cylinders simultaneously and each actuates its associated brake gear to bring the brake shoes into contact with the wheels. At the same time, the braking reaction tends to move the brake cylinders away from one another, and these opposed forces are resisted or taken up by the tie bars 48 and 49. As a result, the truck frame, and particularly the transoms, are relieved of braking strain and the truck frame may be made correspondingly lighter.

The brake arrangement of this invention enables a minimum number of parts to be used and consequently reduces weight and cost to a minimum. The levers and other parts of the brake gear are arranged so as to make economical use of the available space and the brake gear applies the brakes with quick positive action.

We claim:

1. In a car truck, a truck frame including side frames connected by transoms, wheeled axles supporting the truck frame, brake cylinders mounted on the inside of the truck frame and facing one another, brake gear for applying braking pressure to the wheels, and a tie bar connecting the two cylinders beneath the transoms and adapted to relieve the truck frame of braking strain.

2. In a car truck, a truck frame including side frames connected by transoms, wheeled axles supporting the truck frame, brake cylinders mounted on the inside of the truck frame and facing one another, brake gear for applying braking pressure to the wheels, and a tie bar connecting the two cylinders beneath the transoms and adapted to relieve the truck frame of braking strain, said brake gear including a rock shaft having arms providing a power advantage.

3. In a car truck, a truck frame, wheeled axles supporting the frame, a center bearing, brake cylinders mounted on the truck frame on opposite sides of the center bearing along the longitudinal axis of the truck and facing each other, brake gear associated with each cylinder for applying braking pressure to the axle closest thereto, and a tie bar connecting the brake cylinders and relieving the truck frame of braking strain.

4. In a car truck, a truck frame, wheeled axles supporting the frame, a center bearing, brake cylinders mounted on the truck frame on opposite sides of the center bearing along the longitudinal axis of the truck and facing each other, brake gear associated with each cylinder for applying braking pressure to the axle closest thereto, and a tie bar connecting the brake cylinders and relieving the truck frame of braking strain, said brake gear including an equalizer lever and truck levers, and means for slidably supporting the equalizer lever.

5. In a car truck including two or more wheeled axles, a pair of brake cylinders mounted in tandem on the truck, brake gear for applying braking pressure to the wheels, and means for connecting the two brake cylinders together whereby the braking reaction of the cylinders is taken by said connecting means so that the truck frame is relieved of strain.

6. In a car truck including two or more wheeled axles, a pair of brake cylinders supported on the truck with their axes alined and with their push rod ends facing each other, brake gear for applying braking pressure to the wheels and a tie bar connecting the two brake cylinders whereby the braking reaction of the cylinders places the bar in tension and relieves the truck frame of strain.

7. In a car truck including a bolster and two or more wheeled axles, a pair of brake cylinders suspended in tandem from the car truck on opposite sides of the bolster, brake gear for applying braking pressure to the wheels, and means for connecting the cylinders whereby the braking reaction is taken by the connecting means and the truck frame is relieved of strain.

8. In a car truck, a truck frame, a plurality of wheeled axles for supporting said frame, a brake cylinder for each axle mounted on the truck, brake mechanism for applying braking pressure to the wheels of said truck, and means for connecting said cylinders together whereby the reaction of the cylinders is taken by the connecting means so that the truck frame is relieved of strain.

9. In a car truck, a truck frame, wheeled axles supporting the truck frame, a brake cylinder mounted on the truck frame with its axis substantially along the longitudinal center line of the truck and with the operating end of the cylinder facing inwardly, a tie bar between said cylinders for receiving the reaction of said cylinders when the brakes are applied, and a brake gear for each axle for applying braking pressure to the wheels, each gear including an equalizer lever, and a power multiplying device.

10. In a car truck having a frame and axles with wheels thereon, a brake system for retarding the speed of the truck said system comprising brake shoes for frictionally engaging the corresponding wheels, a brake cylinder having a piston, an equalizer bar connected to said piston, a rockshaft rotating about a vertical axis journaled in said frame at each side thereof, lever arms on said shafts, means for connecting certain of said arms to said equalizer bar, and means for connecting the remaining arms to said shoes for applying the same to the wheels when said cylinder is operated.

MARTIN P. BLOMBERG.
MILTON E. SHAVER.